United States Patent
Lin et al.

(10) Patent No.: US 9,516,710 B1
(45) Date of Patent: Dec. 6, 2016

(54) LIGHT EMITTING DIODE DRIVING DEVICE WITH CONTROL BASED ON LED SETTING RESISTANCE

(71) Applicant: Salcomp Taiwan Co., Ltd, Taipei (TW)

(72) Inventors: Ying-Chu Lin, Taipei (TW); Hung-Yi Shu, Taipei (TW)

(73) Assignee: SALCOMP TAIWAN CO., LTD, Taipei (TW)

( * ) Notice: Subject to any disclaimer, the term of this patent is extended or adjusted under 35 U.S.C. 154(b) by 0 days.

(21) Appl. No.: 14/750,237

(22) Filed: Jun. 25, 2015

(51) Int. Cl.
   *H05B 33/08* (2006.01)

(52) U.S. Cl.
   CPC ...... *H05B 33/0815* (2013.01); *H05B 33/0812* (2013.01)

(58) Field of Classification Search
   CPC .................. H05B 33/0815; H05B 33/0812
   USPC ........................................................ 315/206
   See application file for complete search history.

(56) References Cited

U.S. PATENT DOCUMENTS

| | | | | |
|---|---|---|---|---|
| 2002/0047646 | A1* | 4/2002 | Lys | H05B 33/0803 315/312 |
| 2006/0220571 | A1* | 10/2006 | Howell | H05B 33/0812 315/86 |
| 2013/0082609 | A1* | 4/2013 | Williams | H05B 33/0884 315/185 R |
| 2014/0070705 | A1* | 3/2014 | Cheng | H05B 33/0815 315/121 |
| 2014/0167632 | A1* | 6/2014 | Pijlman | H05B 33/0806 315/192 |
| 2015/0271884 | A1* | 9/2015 | Kim | H05B 33/0845 315/153 |

FOREIGN PATENT DOCUMENTS

DE   202015103516 U1 *  8/2015  ............. H05B 37/02

* cited by examiner

*Primary Examiner* — Dylan White
(74) *Attorney, Agent, or Firm* — Muncy, Geissler, Olds & Lowe, P.C.

(57) ABSTRACT

A light emitting diode (LED) driving device with control based on LED setting resistance is disclosed. The LED driving device is applied to an LED lighting fixture having a setting resistor and is configured to modulate output voltage and output current according to the setting resistor to fit the power requirement of the LED lighting fixture. The LED driving device includes a power conversion module and a driving module. The driving module includes a microprocessor and controlling unit. The microprocessor is electrically connected to the LED lighting fixture for sensing the setting resistor and generates a controlling signal in accordance with the sensed setting resistor to the controlling unit. The controlling unit is electrically connected to the microprocessor and the power conversion module and configured to drive the power conversion module to modulate output current and output voltage according to the controlling signal.

9 Claims, 3 Drawing Sheets

LIGHT EMITTING DIODE DRIVING DEVICE WITH CONTROL BASED ON LED SETTING RESISTANCE

BACKGROUND OF THE INVENTION

Field of the Invention

The present invention relates to driving device, and in particular to a light emitting diode driving device.

Description of Related Art

Light emitting diodes (LEDs) have high luminous efficiency, long service time, widely operation temperature and environmental mercury-free, making them beyond the incandescent and fluorescent light bulbs, and led lighting field into a new solid-state lighting era.

General lighting fixtures, such as incandescent lamps, fluorescent bulbs or lamps are usually driven by alternative current (AC) electric power, however, the LEDs are driven be direct current (DC) electric power. Thus, an essential condition for replacing incandescent lamps, fluorescent bulbs or lamps with LED lighting fixture is that the LED lighting fixture can directly connected to AC electric power.

LEDs are semiconductor devices with low turn on voltage, and can emit light when an electrical current is passed through it in a specific direction. Moreover, LEDs are also current dependent devices with their light output intensity being directly proportional to the forward current flowing therethrough. Since the LEDs cannot have totally same parameters (such as internal resistance) even in the same manufacturing process, the same type of lighting fixtures with the LEDs cannot provide light with the same luminous intensity.

SUMMARY OF THE INVENTION

An object of the present invention is to provide a light emitting diode (LED) driving device, which is used for driving an LED lighting fixture, the LED driving device can applied to different LED lighting fixtures, and makes the LED lighting fixtures have the same luminosity.

According to one aspect of the present disclosure, a LED driving device applied to an LED lighting fixture having a setting resistance includes a power conversion module and a driving module. The driving module includes a microprocessor and a controlling unit. The microprocessor is electrically connected to the LED lighting fixture, and the controlling unit is electrically connected to the microprocessor and the power conversion module.

The microprocessor senses the setting resistance of the LED lighting fixture and sends a controlling signal according to the setting resistance to the controlling unit, and the controlling unit receives the controlling signal and drives the power conversion module to modulate output current and output voltage according to the controlling signal.

The LED driving device modulates output voltage and output current according to the setting resistance of the LED light fixture, so that the LED light fixture not only can effective be driven but also achieve the effect of energy conservation.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
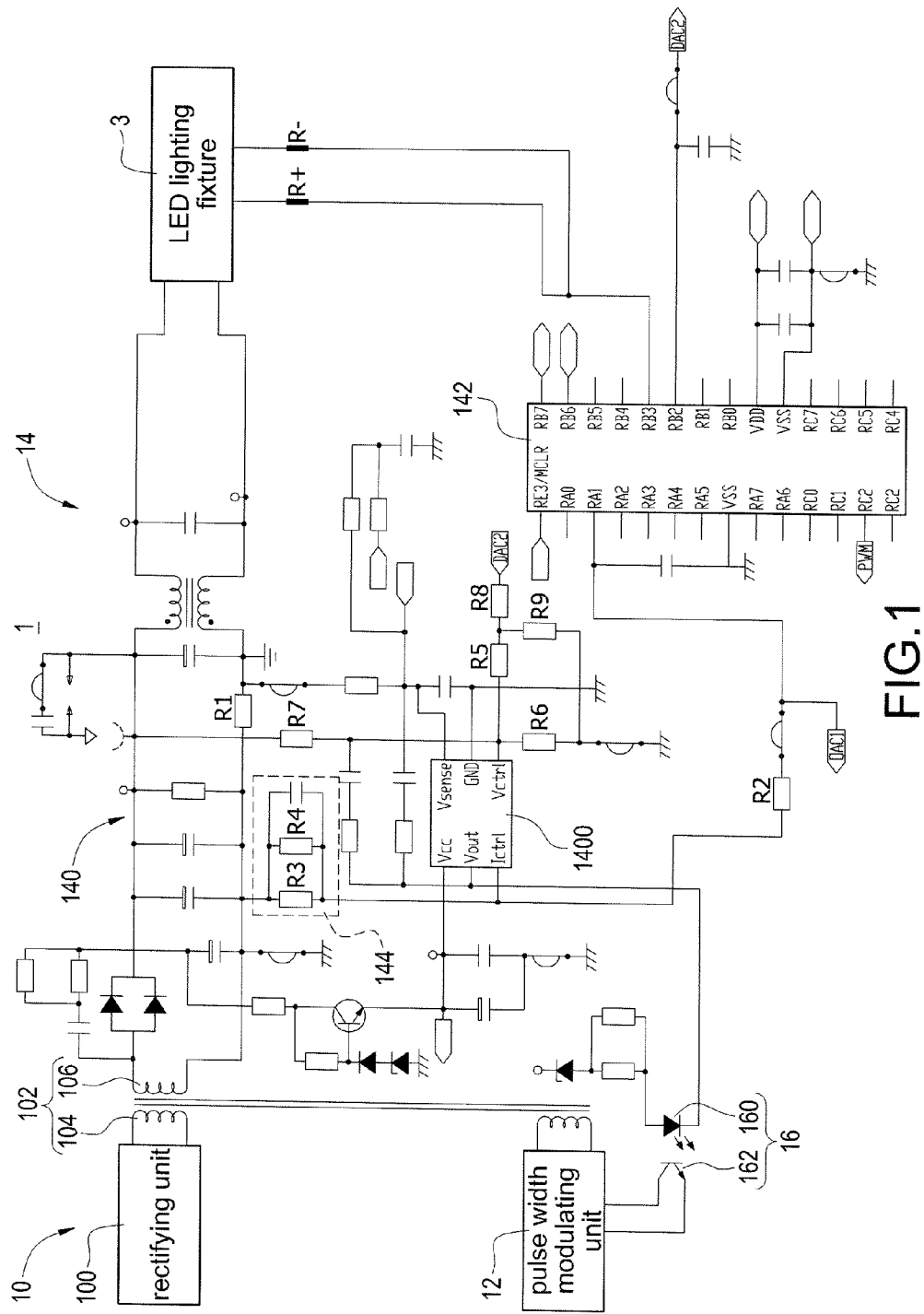
FIG. 1 is a circuit diagram of a light emitting diode (LED) driving circuit according to a first embodiment of the present disclosure.

Reference is made to FIG. 1, which is a circuit diagram of a light emitting diode (LED) driving device according to a first embodiment of the present invention. The LED driving device 1 is applied to an LED lighting fixture 3 with a maximum output power of 60 watts. In particular, the LED driving device 1 is applied to the LED lighting fixture 3 with the maximum output power of 50 watts. The LED light fixture 3 can be light tube, road lamp, light bulb or other lighting apparatus having LED.

The LED driving device 1 includes a power conversion module 10, a pulse width modulating unit 12, and a driving module 14. The LED lighting fixture 3 is electrically connected to the driving module 14 and receives an electric power outputted by the LED driving device 1.

The power conversion module 10 includes a rectifying unit 100 and a conversion unit 102. The rectifying unit 100 is electrically connected to an alternative current (AC) electric power (not otherwise herein labeled) and used for converting the AC electric power into a direct current (DC) electric power, the DC electric power is then transmitted to the conversion unit 102. The rectifying unit 100 can be a bridge rectifier, and the conversion unit 102 can be an isolating transformer having a primary winding 104 and a secondary winding 106. The rectifying unit 100 is electrically connected to the primary winding 104 of the conversion unit 102, and the driving unit 14 is electrically connected to the secondary winding 106 of the conversion unit 102.

The driving module 14 includes a controlling unit 140, a microprocessor 142, and a plurality of resistance sensing terminals R+ and R−. The controlling unit 140 is electrically connected to the secondary winding 106 of the power conversion unit 10, and the microprocessor 142 is electrically connected to the pulse width modulating unit 12 and the controlling unit 140. One side of each of the resistance sensing terminal R+, R− is electrically connected to the microprocessor 142, and the other side of each of the resistance terminal R+, R− is electrically connected to the LED lighting fixture 3 for sensing a setting resistance of the LED lighting fixture 3. The sensed setting resistance is then transmitted to the microprocessor 142. The LED driving device 1 further includes an optical isolator 16 arranged between the microprocessor 142, the controller 140, and the pulse width modulating unit 12. The optical isolator 16 includes a lighting emitting side 160 and a light receiving side 162, the light emitting side 160 is electrically connected to the microprocessor 142 and the controlling unit 140, and the light receiving side 162 is electrically connected to the pulse width modulating unit 12.

The controlling unit 140 includes a driving component 1400, a first resistor R1, a second resistor R2, a third resistor R3, a fourth resistor R4, a fifth resistor R5, a sixth resistor R6, a seventh resistor R7, an eighth resistor R8, and a ninth resistor R9. The driving unit 1400, the first resistor R1, the second resistor R2, and a resistance unit 144 collectively form a constant-current controlling circuit, wherein the resistance unit 144 formed by the third resistor R3 and the fourth resistor R4 electrically connected in parallel. The driving unit 1400, the fifth resistor R5, the sixth resistor R6, the seventh resistor R7, the eighth resistor R8, and the ninth resistor R9 collectively form a constant-voltage controlling unit.

Figure 2:
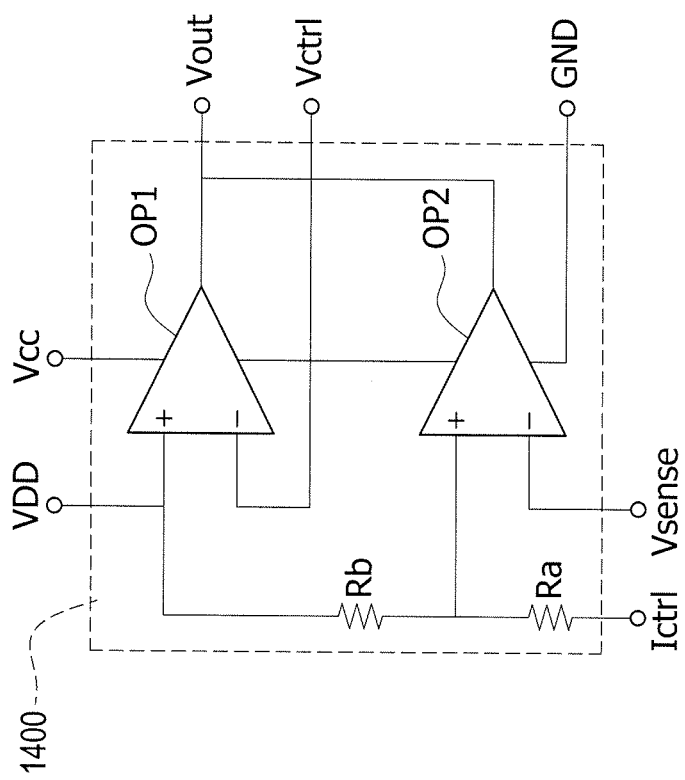
FIG. 2 is a circuit diagram of a driving component according to the first embodiment of the present disclosure.

Reference is made to FIG. 2, which is a circuit diagram of a driving component according to the first embodiment of the present disclosure. The driving component 1400 includes a first operational amplifier OP1 and second operational amplifier OP2, not only the first operational amplifier OP1 but also the second operation amplifier OP2 includes an inverting input end, a non-inverting input end, and an output end.

The inverting input end of the second operational amplifier OP2 is electrically connected to the first resistor R1, and the non-inverting input end thereof is electrically connected to the second resistor R2, the third resistor R3, and the fourth resistor R4 via a first internal resistor Ra. The output end of the second operational amplifier OP2 is electrically connected to the pulse width modulating unit 12 via the optical isolator 16.

With refer again to FIG. 1, one end of the second resistor R2 is electrically connected to the driving component 1400 and the resistance unit 144, and the other end thereof is electrically connected to the microprocessor 142. One end of the resistance unit 144 is electrically connected to the driving component 1400, and the other end thereof is electrically connected to the secondary winding 106 of the power conversion module 10.

The inverting end of the first operational amplifier OP1 is electrically connected to the fifth resistor R5, the sixth resistor R6, and the seventh resistor R7, the non-inverting end thereof is electrically connected to the non-inverting end of the second operational amplifier OP2 via the second internal resistor Rb. The output end of the first operational amplifier OP1 is electrically connected to the pulse width modulating unit 12 via the optical isolator 16. The non-inverting end of the first operational amplifier OP1 can also be electrically connected to a constant-voltage source VDD, such as a DC power source which can provide an electric power with 2.5 volts.

One end of the sixth resistor R6 is electrically connected to the driving component 1400, and the other end thereof is electrically connected to ground. One end of the seventh resistor R7 is electrically connected to the driving component 1400, and the other end thereof is electrically connected to the secondary winding 106 of the conversion unit 102. One end of the eighth resistor R8 is electrically connected to the microprocessor 142, and the other end thereof is electrically connected to the fifth resistor R5. One end of the ninth resistor R9 is electrically connected to the fifth resistor R5 and the eighth resistor R8, and the other end thereof is electrically connected to ground.

The microprocessor 142 senses the setting resistance of the LED lighting fixture 3 via the resistance sensing terminals R+ and R−, and generates a controlling signal according to the Table 1 via the current output terminal RA1, and then sends the controlling signal to the controlling unit 140, such that the output current and output voltage of the LED driving device 1 can be modulated by the pulse width modulating unit 12 which receives a driving signal generated by the controlling unit 140 according to the controlling signal.

TABLE 1

| Setting Resistance (KOhm) | Output Current (A) | Output Voltage (V) | Maximum Output Voltage (V) | Maximum Output Power (W) |
| --- | --- | --- | --- | --- |
| 0.832 | 0.503 | 20~50 | 50 | 25.2 |
| 0.866 | 0.518 | 20~50 | 50 | 25.9 |
| 1 | 0.535 | 20~50 | 50 | 26.8 |
| 1.3 | 0.57 | 20~50 | 50 | 28.5 |
| 1.5 | 0.592 | 20~50 | 50 | 29.6 |
| 2 | 0.642 | 20~50 | 50 | 32.1 |
| 2.55 | 0.693 | 20~50 | 50 | 34.7 |
| 2.7 | 0.703 | 20~50 | 50 | 35.2 |
| 3.3 | 0.746 | 20~50 | 50 | 37.3 |
| 3.6 | 0.77 | 20~50 | 50 | 38.5 |
| 3.9 | 0.79 | 20~50 | 50 | 39.5 |
| 4.3 | 0.813 | 20~50 | 50 | 40.7 |
| 4.7 | 0.833 | 20~50 | 50 | 41.7 |
| 6.2 | 0.905 | 20~50 | 50 | 45.3 |
| 7.5 | 0.954 | 20~50 | 50 | 47.4 |
| 8.2 | 0.972 | 20~50 | 50 | 48.6 |
| 9.1 | 0.995 | 20~50 | 50 | 49.8 |
| 9.53 | 1.01 | 20~50 | 50 | 50.5 |
| 10 | 1.02 | 20~50 | 50 | 51 |
| 11 | 1.045 | 20~48 | 48 | 50.2 |
| 13 | 1.08 | 20~45 | 45 | 48.6 |
| 15 | 1.113 | 20~44 | 44 | 49 |
| 20 | 1.17 | 20~42 | 42 | 49.1 |
| 24 | 1.203 | 20~41 | 41 | 49.3 |
| 30 | 1.239 | 20~40 | 40 | 49.6 |
| 33 | 1.25 | 20~40 | 40 | 50 |
| 43 | 1.283 | 20~39 | 39 | 50 |
| 51 | 1.3 | 20~37 | 37 | 48.1 |
| 82 | 1.34 | 20~36 | 36 | 48.2 |
| 120 | 1.36 | 20~36 | 36 | 49 |
| 620 | 1.388 | 20~36 | 36 | 50 |
| 820 | 1.39 | 20~36 | 36 | 50 |

The LED driving device 1 of the present disclosure modulates output voltage and output current according to the setting resistance of the LED light fixture 3, so that the LED driving device 1 can provide enough electric power to the LED light fixture 3, and dissipation of electric energy can be effectively reduced to achieve the effect of energy conservation.

Figure 3:
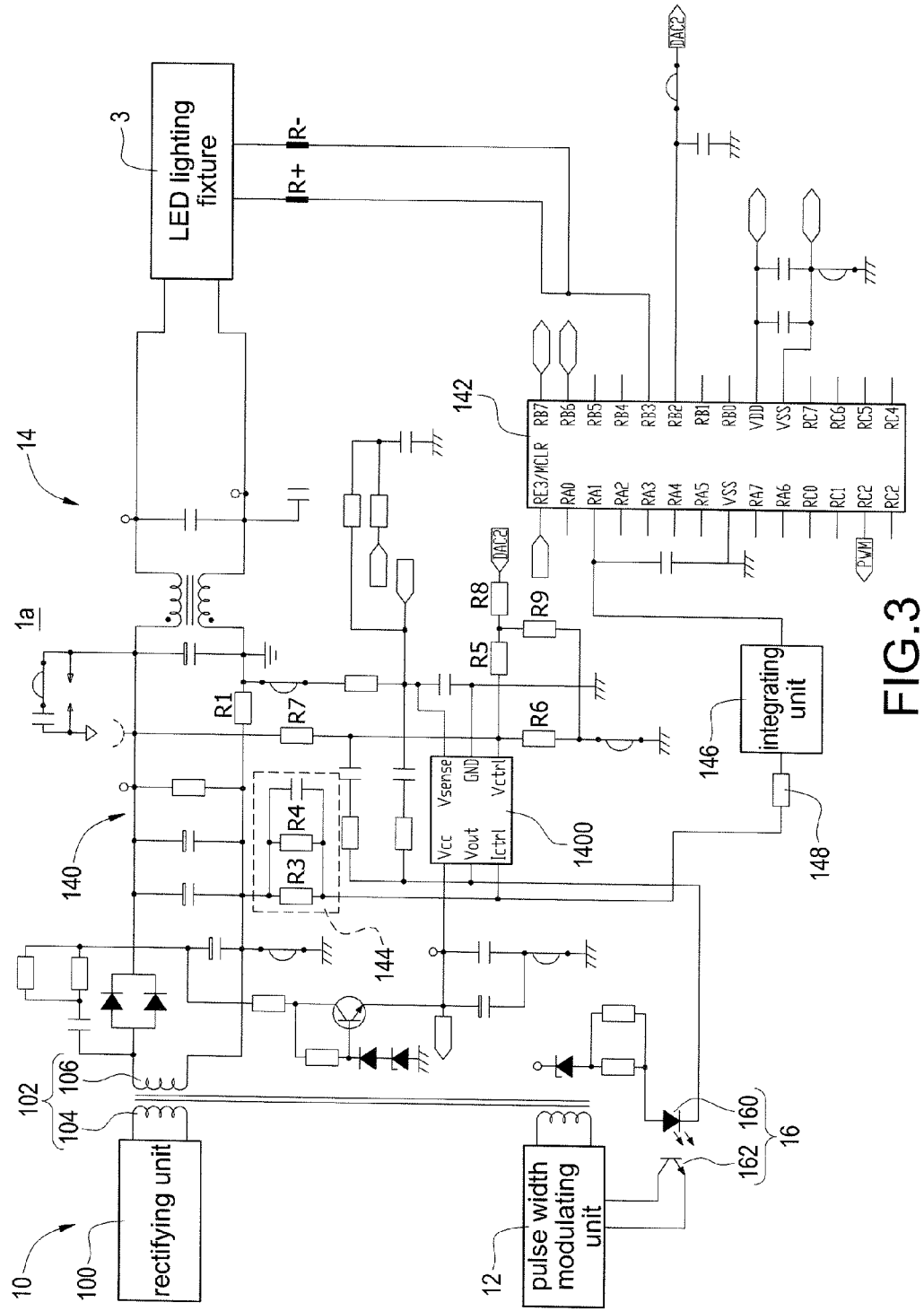
FIG. 3 is a circuit diagram of an LED driving device according to a second embodiment of the present disclosure.

Reference is made to FIG. 3, which is a circuit diagram of the LED driving device according to a second embodiment of the present disclosure. The LED driving device 1a is similar to the LED driving device 1 mentioned in the first embodiment, and the same reference numbers are used in the drawings and the description to refer to the same parts. It should be noted that controlling unit 14 of the LED driving device 1a further includes an integrated circuit 146 and a variable resistor 148, and there is no second resistor R2 in the LED driving device 1a. The integrated circuit 146 is electrically connected to the microprocessor 142, and the variable resistor 148 is electrically connected to the integrated circuit 146 and the resistance unit 144. As can be shown in FIG. 3, the variable resistor 148 is electrically connected to the resistance unit 144 in series. In the practical application, however, the variable resistor 148 can be electrically connected to the resistance unit 144 in parallel.

The microprocessor 132 senses the setting resistance of the LED lighting fixture 3 via the resistance sensing terminals R+ and R−, generates a controlling signal according to the Table 1 for changing the resistor value of the variable resistor 148, such that an equivalent resistance of the resistance unit 144 and the variable resistor 148 is then changed. In this manner, the output current of the LED driving device 1a is changed by the driving signal generated by the controlling unit 140 according to the equivalent resistance. The function and relative description of other components of the LED driving device 1a are the same as that of first embodiment mentioned above and are not repeated here for brevity, and the LED driving device 1a can achieve the functions as the LED driving device 1 does.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A light emitting diode (LED) driving device electrically connected to an LED lighting fixture with a setting resistance, LED driving device comprising:
    a power conversion module; and
    a driving module comprising:
        a microprocessor electrically connected to the LED lighting fixture for sensing the setting resistance and generating a controlling signal according to the setting resistance; and
        a controlling unit electrically connected to the microprocessor, wherein the controlling unit receives the controlling signal and drives the power conversion module to modulate an output current and an output voltage according to the controlling signal.

2. The LED driving device of claim 1, wherein the controlling unit comprising;
    a driver component comprising a first operational amplifier and a second operational amplifier, the first operational amplifier comprising an inverting input end, a non-inverting input end, and an output end, the second operational amplifier comprising an inverting input end, a non-inverting input end, and an output end, the output ends of the first operational amplifier and the second operational amplifier are electrically connected to the power conversion module, respectively;
    a first resistor electrically connected to the power conversion module and the inverting input end of the second operational amplifier;
    a second resistor electrically connected to the non-inverting input end of the second operational amplifier; and
    a resistance unit electrically connected to the power conversion module and the non-inverting input end of the second operational amplifier.

3. The LED driving device of claim 2, wherein the resistance unit comprises a third resistor and a fourth resistor electrically connected in parallel.

4. The LED driving device of claim 3, wherein the controlling unit further comprises:
    a fifth resistor electrically connected to the inverting input end of the first operational amplifier;
    a sixth resistor electrically connected to the inverting input end of the first operational amplifier;
    a seventh resistor electrically connected to the inverting input end of the first operational amplifier and the power conversion module;
    an eighth resistor electrically connected to the microprocessor and the fifth resistor; and
    a ninth resistor electrically connected to the fifth resistor and the eighth resistor.

5. The LED driving device of claim 4, wherein the driving component further comprises a first internal resistor and a second internal resistor, the first internal resistor is electrically connected to the non-inverting input end of the second operational amplifier, the second resistor, and the third resistor, the second internal resistor is electrically connected to the non-inverting input end of the first operational amplifier and the non-inverting input end of the second operational amplifier.

6. The LED driving device of claim 5, wherein the power conversion module comprising:
    a rectifying unit;
    a converting unit comprising a primary winding electrically connected to the rectifying unit and a secondary winding electrically connected to the driving module; and
    a pulse width modulating unit electrically connected to the primary winding, the output end of the first operational amplifier, and the output end of the second operational amplifier.

7. The LED driving device of claim 6, further comprising an optical isolator electrically connected to the microprocessor, the controlling unit, and the pulse width modulating unit.

8. The LED driving device of claim 7, wherein the optical isolator comprises a light emitting side and a light receiving side, the light emitting side of the optical isolator is electrically connected to the microprocessor and the controlling unit, and the light receiving side of the optical isolator is electrically connected to the pulse width modulating unit.

9. The LED driving device of claim 1, further comprising a variable resistor electrically connected to the microprocessor and the resistance unit, wherein the variable resistor is electrically connected to the resistance unit in series.

* * * * *